350-163. SR 1-22-74 XR 3,787,117

United States Patent [19]

Watkins

[11] 3,787,117

[45] Jan. 22, 1974

[54] METHODS AND APPARATUS FOR INSPECTING WORKPIECES BY SPATIAL FILTERING SUBTRACTION

[75] Inventor: Laurence Shrapnell Watkins, Hopewell Twp., Mercer, N.J.

[73] Assignee: Western Electric Company, Incorporated, New York, N.Y.

[22] Filed: Oct. 2, 1972

[21] Appl. No.: 294,284

[52] U.S. Cl. .......................... 353/20, 350/163, 353/30, 356/111

[51] Int. Cl. .......................... G03b 21/14

[58] Field of Search 350/162, 163; 356/106 R, 107, 356/109, 111; 353/20, 30, 122

[56] References Cited

UNITED STATES PATENTS

| | | | |
|---|---|---|---|
| 3,468,609 | 9/1969 | Sterrett et al. | 356/107 |
| 3,642,374 | 3/1970 | Matsumoto et al. | 356/107 |

FOREIGN PATENTS OR APPLICATIONS

| | | | |
|---|---|---|---|
| 1,009,375 | 11/1965 | Great Britain | 356/111 |
| 1,211,817 | 3/1966 | Germany | 356/111 |

*Primary Examiner*—Louis R. Prince
*Assistant Examiner*—Steven L. Stephan
*Attorney, Agent, or Firm*—B. W. Sheffield

[57] ABSTRACT

Integrated circuit and thin-film photomasks are inspected by a spatial filtering subtraction technique. The photomask to be inspected is illuminated by coherent, collimated radiation from a laser. An apertured mask is placed in front of the photomask to block light from all except two, spaced-apart columns in the array of features on the photomask. A lens forms Fraunhoffer diffraction patterns of the two apertured portions of the photomask at the focal plane of the lens, and these patterns are passed through an asymmetrically positioned optical grating. The diffraction patterns are then displayed on a screen. The grating produces a central image and two side images of each apertured portion of the photomask. The centermost side images of each aperture are 180° out of phase and cancel, because the columns of the photomask are identical. Differences between the two columns, which include nonperiodic errors in the photomask, are not cancelled and, hence, are readily detected.

23 Claims, 6 Drawing Figures

METHODS AND APPARATUS FOR INSPECTING WORKPIECES BY SPATIAL FILTERING SUBTRACTION

BACKGROUND OF THE INVENTION

1. Field of the Invention

Broadly speaking, this invention relates to spatial filtering. More particularly, this invention relates to methods and apparatus for inspecting workpieces by means of a spatial filtering subtraction technique.

2. Discussion of the Prior Art

The use of spatial filtering to inspect workpieces is disclosed in copending application, Ser. No. 858,002, filed Sept. 15, 1969, which is assigned to the assignee of the instant invention.

Among the exemplary workpieces discussed in said copending application are integrated circuit photomasks and the target grids for Picturephone camera tubes. Such workpieces are characterized by matrix-like arrays of normally identical elements, for exmple, the individual integrated ciruit features on an IC photomask or the target grid cross-points on a Picturephone grid.

A problem arises, however, when the workpiece to be inspected includes an array having relatively large element-to-element spacing or one which includes an array which is smaller than 5 × 5 elements. With such workpieces, there are insuffcent repeated patterns within the field of view of the system to produce a proper diffraction pattern and, consequently, the spatial filtering techniques disclosed in my aforesaid copending application are of limited effectiveness. Examples of workpieces which cannot be inspected satisfactorily using normal spatial filtering techniques are integrated circuit photomasks having a step-and-repeat greater than about 200 mils or one dimensional arrays, and thin-film photomasks having only a small number of circuit patterns thereon.

SUMMARY OF THE INVENTION

As a solution to this and other problems, I disclose herein methods and apparatus for inspecting workpieces by spatial filtering subtraction. More specifically, a first embodiment of the invention comprises a method of detecting nonperiodic errors in a workpiece containing a matrix-like array of normally identical elements. The method comprises the steps of first directing a beam of coherent radiation onto the workpiece to modulate the beam, and then passing the modulated beam through a mask containing at least two apertures, the apertures being aligned with the columns of the array, the widths of the apertures, and the aperture-to-aperture spacing, both being functions of the element-to-element spacing along the rows of the array. Next, the beam is passed through a lens positioned in the path of the apertured beam from the mask to form Fraunhoffer diffraction patterns of portions of the workpiece in the focal plane of the lens. Then the beam is passed through an optical grating positioned in the path of the beam, in the focal plane of the lens, the rulings of the grating being parallel with a major axis of said apertures, and asymmetric with respect to the optical axis, and grating periodicity being a function of the element-to-element spacing along the rows of the array. Finally, the resultant central and side images of each apertures in the mask are displayed on detecting means, the centermost side images of each aperture overlapping and cancelling, except for nonperiodic errors in the workpiece which are not cancelled, and hence, are detected.

To practice the above method, a second embodiment of the invention comprises an apparatus for detecting nonperiodic errors in a workpiece containing a matrix-like array of normally identical elements. The apparatus comprises a source of a beam of coherent, collimated radiation illuminating the workpiece to be inspected, and a mask, positioned to intercept the beam after passage through the workpiece, the mask having at least two apertures therein aligned with the columns of the array, the widths of the apertures and the aperture-to-aperture spacing being functions of the element-to-ement spacing along the rows of the array. The apparatus further includes a lens, positioned to intercept the beam after passage through the mask, for forming Fraunhoffer diffraction patterns of portions of the workpiece in the focal plane of the lens, and an optical grating, positioned in said focal plane, to form a central image, and at least two side images, of each of the apertures in the mask, the rulings of said grating being parallel to a major axis of the apertures in the mask and asymmetric with respect to the optical axis, and the grating periodicity being a function of the element-to-element spacing along the rows of the array. Finally, the apparatus includes means, positioned to intercept the beam after it has been diffracted by the grating, for displaying the central and side images of each of the apertures, the centermost side image of each aperture overlapping and cancelling, except for nonperiodic errors which are not cancelled and, hence, are detected.

The invention and its mode of operation will be more fully understood from the following detailed description and the drawings, in which:

DETAILED DESCRIPTION OF THE INVENTION

Figure 1:
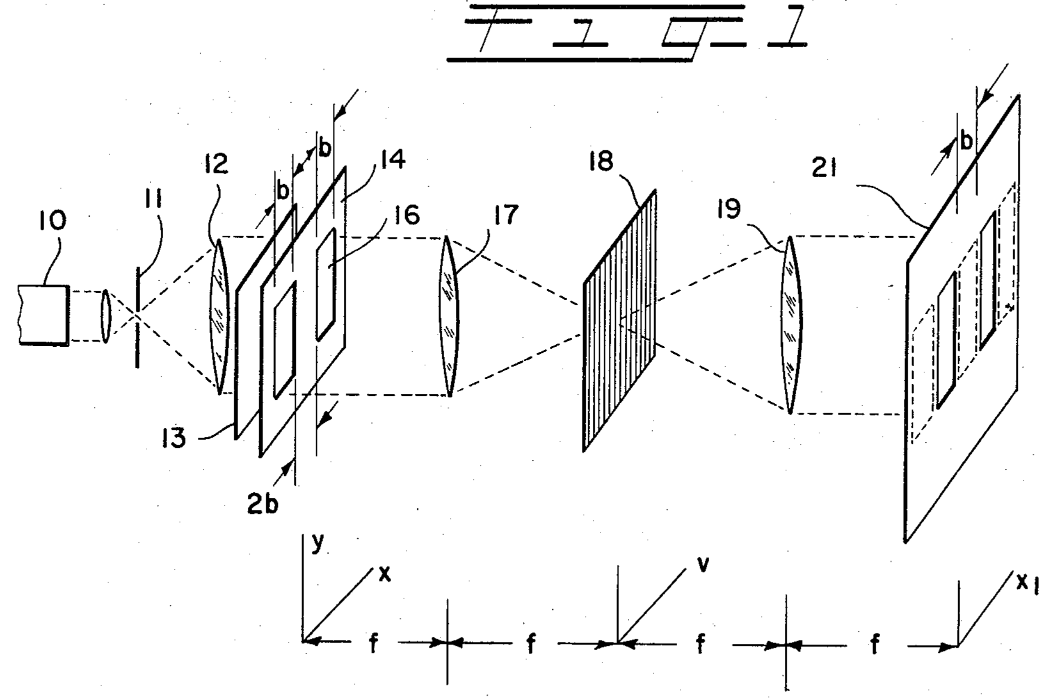
FIG. 1 is a schematic view of a first embodiment of the invention.

Referring now to FIG. 1, coherent radiation from a laser 10 is passed through a pinhole 11 and collimated by a first lens 12. The collimated beam then passes through the workpiece to be inspected 13 and a mask 14.

The mask 14 has a pair of apertures 16 therein and the width of each aperture (b) is equal to half the aperture-to-aperture separation (2b) of the mask.

The bam from laser 10 next passes through a second lesn 17 which forms the Fraunhoffer diffraction pattern of the apertured workpiece (i.e. the Fourier transform), that is to say, the spatial frequency spectrum of these parts of the workpiece which are "visible" through the apertures in mask 14, at the focal plane of the lens. An optical grating 18 is positioned at the focal plane of lens 17, and, after passage through the grating, the laser beam passes through a third lens 19 which reconstructs the image and displays it on some suitable display device, for example on a screen 21.

Figure 2:
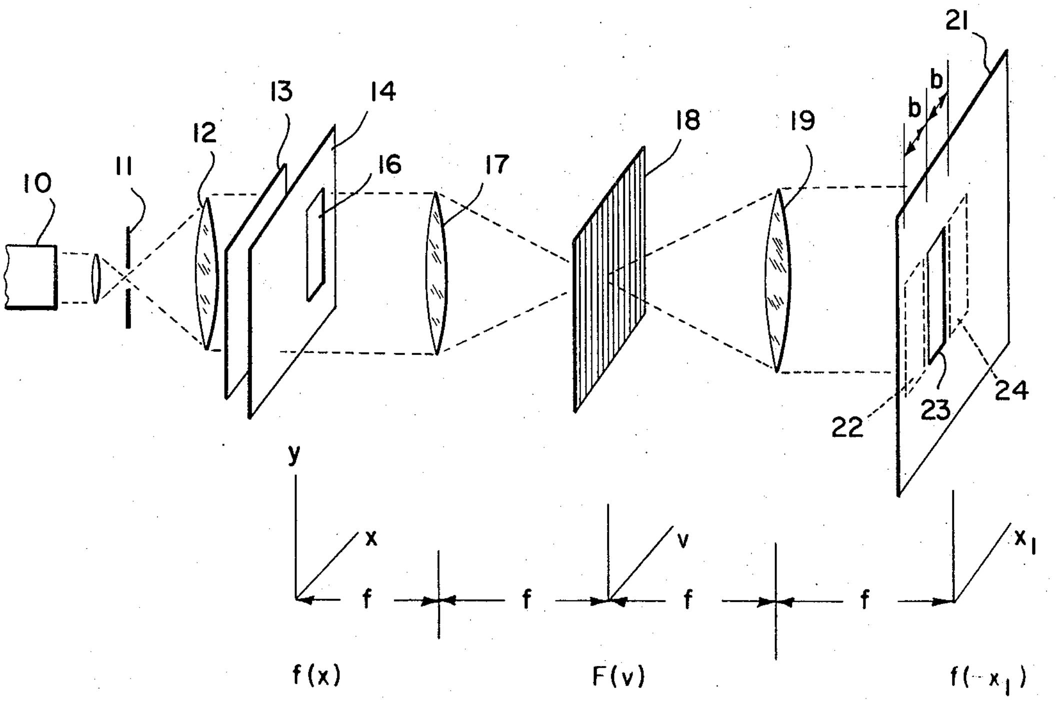
FIG. 2 is another schematic view of the invention useful in understanding the underlying theory thereof.

The underlying theory of the invention will be more clearly understood if only one aperture at a time is considered. Thus, as shown in FIG. 2, assume that mask 14 only contains one aperture 16 and that the other aperture is blocked. To simplify the calculations, only a one dimensional analysis is presented, the one dimension being that which is perpendicular to the rulings in grating 18. This simplifed analysis is permissible because there is no trnsmission variation in the other direction; thus, there is no need to consider transmission variations in that direction.

If we assume that the mask transmission charactertic may be expressed as $f(x)$, then the resulting light amplitude at the grating will be the Fraunhoffer difrraction pattern of Fourier transform F(v), where $v$ is the coordinate at the grating, as given by the equation $$F(v)=C\int_{-\infty}^{+\infty} f(x)e^{-j(2\pi/\lambda)\cdot x\cdot v/d}dx \qquad (1)$$

where C is a constant, $d$ is the focal length of lens 17, λ is the wavelength of the light, and $x$ is the mask dimension.

If there were no grating present at the Fourier transform plane then the resulting light pattern at the image plane would be given by the equation:

$$g(x_1)=C\int_{-\infty}^{+\infty} F(v)e^{-j(2\pi/\lambda)vx_1/d}dv \qquad (2)$$

$$=f(-x_1) \qquad (3)$$

where $x_1$ is the image dimension. However, if a grating of amplitude transmission T(v) is placed at the Fourier transform plane, then the resulting image is given by the equation:

$$g_s(x_1)=C\int_{-\infty}^{+\infty} F(v)T(v)e^{-j(2\pi/\lambda)vx_1/d}dv \qquad (4)$$

If we let $$T(v)=T_0-T_1\cos(\beta v),\ 1>T(v)>0, \qquad (5)$$

then the Fourier transform of T(v) is given by the equation:

$$t(x_1)=C\left[\delta(x_1)T_0-\frac{T_1}{2}\delta(x_1-b)-\frac{T_1}{2}\delta(x_1+b)\right] \qquad (6)$$

where $$b=(\beta d_2/2\pi) \qquad (7)$$

Thus, the image can be written as the convolution between $g$ and $t$, that is:

$$g_s(x_1)=f(-x_1)\left[T_0\delta(x_1)-\frac{T_1}{2}\delta(x_1-b)-\frac{T_1}{2}\delta(x_1+b)\right] \qquad (8)$$

As shown in FIG. 2, there will be three imates, 22, 23, and 24 on screen 21, respectively corresponding to each term of Equation 8, image 23 at the position it would have occupied if the grating were not present, and images 22 and 24 at either side of image 23, each spaced a distance $b$ from corresponding points on image 23. The negative sign in Equation 8 indicates that the side images 22,24 are 180° out of phase with the center image 23.

The garting 18, having an amplitude system is T(v) corresponds to an capabilities grating with the the minimum transmission ($T_0$) at the origin. If the grating were moved laterally in the v direction one-half period, then the amplitude transmission T(v) would be defined by the equation:

$$T(v)=T_0+T_1\cos(\beta v). \qquad (9)$$

In this case Equation 6 is modified in that the side images 22,24 become positive.

A more interesting effect occurs if the grating is moved laterally in the v direction by one-quarter period; then T(v) becomes:

$$T(v)=T_0+T_1\sin(\beta v) \qquad (10)$$

and its Fourier transform is:

$$t(x_1)=T_o\,\delta(x_1)-iT_1\,\delta(x_1+b)+iT_1\delta(x_1-b) \qquad (11)$$

In this case, the two side images, 22,24 at $(x_1+b)$ and $(x-b)$ are 180° out of phase with each other and 90° out of phase with the center image 23.

The above analysis will be extended to two aperturs at the workpiece plane, which is, of course, the actual configuration used.

As shown in FIG. 1, mask 14 has two apertures 16. If these apertures are spaced a distance 2b apart then the centermost side image 24 of one aperture will overlap the centermost side image 22 of the other. If the grating is in an asymmetric position (i.e. sin $\beta v$), the side images will subtract because they are from opposite locations on the workpiece and 180° out of phase with each other.

Although the above anaylsis assumes that grating 18 was an absorption grating, essentially the same result would be obtained if grating 18 were a phase grating. However, because a phase grating diffracts light into more than one order, there will be side images at distances $2b$, $3b$, etc. from the central image, the intensities of these side images being given by the phase grating formula, $$T_n=(j)^n J_n(\theta) \qquad (12)$$

where $\theta$ is the phase variation. The same 180° phase shifts are obtained between the two first order images when the grating is asymmetrically positioned so that the same subtraction effects can be realized. The advantage of using a phase grating is its higher efficiency.

Figure 3:
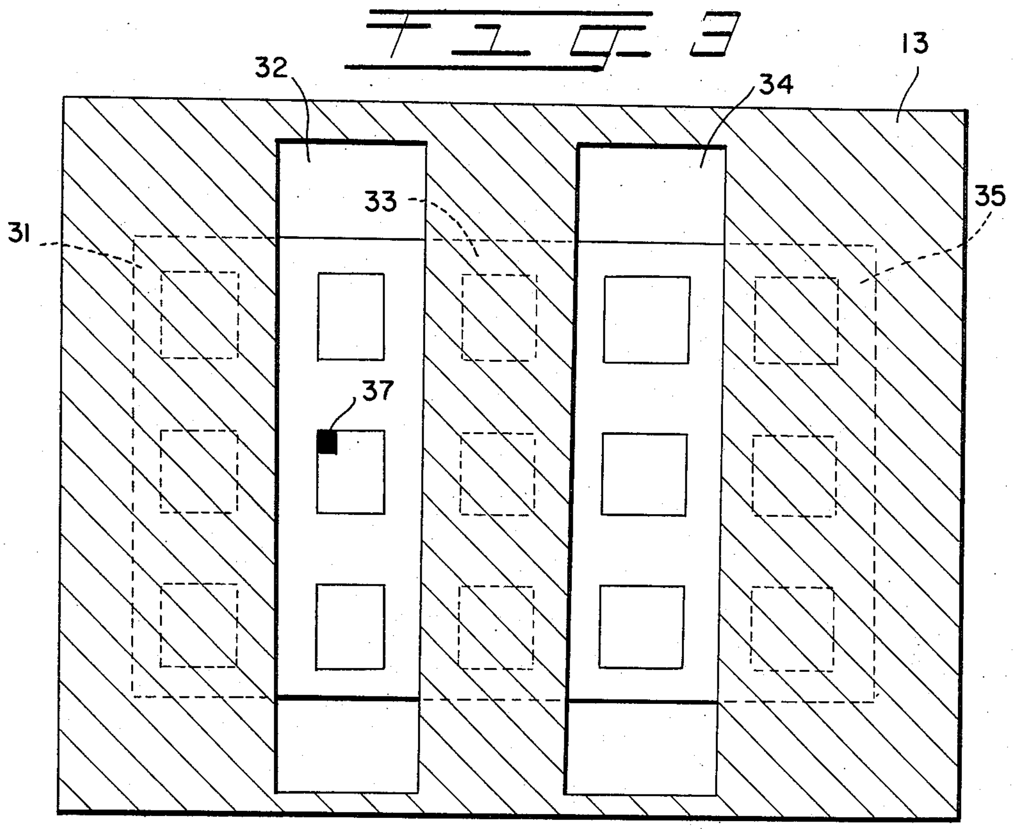
FIG. 3 is a plan view of a typical workpiece having an aperture mask superimposed thereon which may be inspected by the techniques of this invention.
Figure 4:
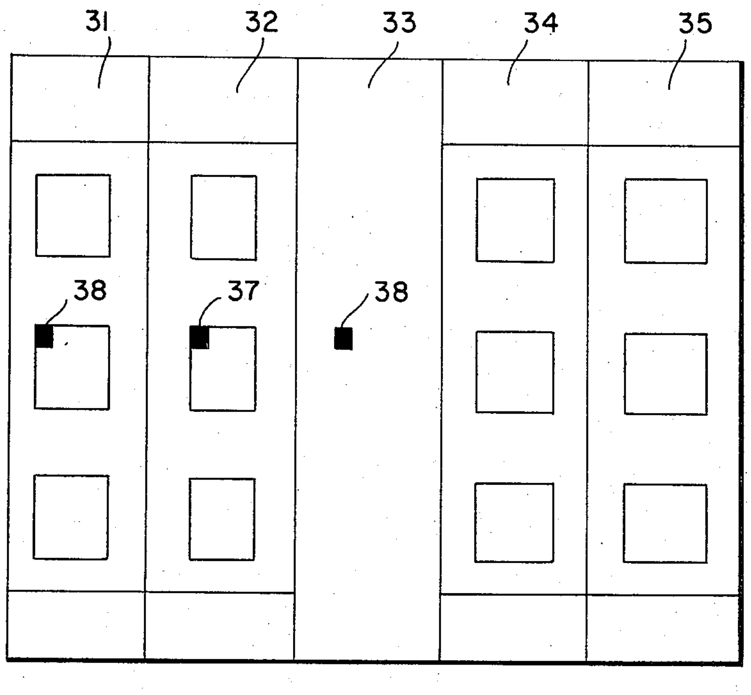
FIG. 4 is a plan view showing the results obtained when the workpiece of FIG. 3 is inspected by the apparatus shown in FIG. 1.

To inspect a given workpiece the translation distance $b$, is made a multiple (or submultiple) of the element-to-element spacing of the workpiece. If the workpiece is an integrated circuit photomask, this corresponds to the step-and-repeat distance of the photomask. Thus, when the workpiece is placed in the system the repeated patterns on screen 21 will be superimposed, as discussed above. If the repeated features or elements in the workpiece are identical, they will subtract to give a blank image on the screen. The aperture mask 14 at the object plane has apertures separated by a distance $2b$ and so, in effect, patterns of twice the step-and-repeat distance are subtracted. This is illustrated in FIG. 3 wherein an integrated circuit or thin-film mask having a 5 × 3 array of repeated features is shown. The second column 32 is subtracted from the fourth column 34. An error 37 is assumed present in one pattern of column 32 and, as shown in FIG. 4, the result of the spatial filtering subtraction is found in the center column 33 where an image 38 of the defect (or differnce between the photomask features) is displayed. The inspection sequence is thus a comparison of column 31 with column 33, column 32 with column 34, and column 33 with column 35. From the above it will be seen that the workpiece must contain at least four columns of elements or circuit features if all of the patterns are to be compared.

One of the inherent properties of a Fourier transform is that it is independent of the workpiece's lateral position, although it is dependent on the rotation of the workpiece. This means that the workpiece need not be critically aligned laterally and, in fact, can be scanned across the apertures in mask 14, after it has been rotationally aligned with the grating 18.

The grating 18 must be of the correct period for the particular repeat distance of the workpiece features. Thus, the same grating may be used to inspect any workpiece with the same step-and-repeat. The grating must be initially adjusted into an asymmetrical position with respect to the optical axis and should not require further adjustment, unless the ptical axis is changed by the insertion of a different type of workpiece.

The performance of the above-described subtraction systemis limited only by the capacilities of the lenses used and by the flatness of the workpiece, which, if the workpiece is a photomask, is the glass plate supporting th photomask features.

Figure 5:
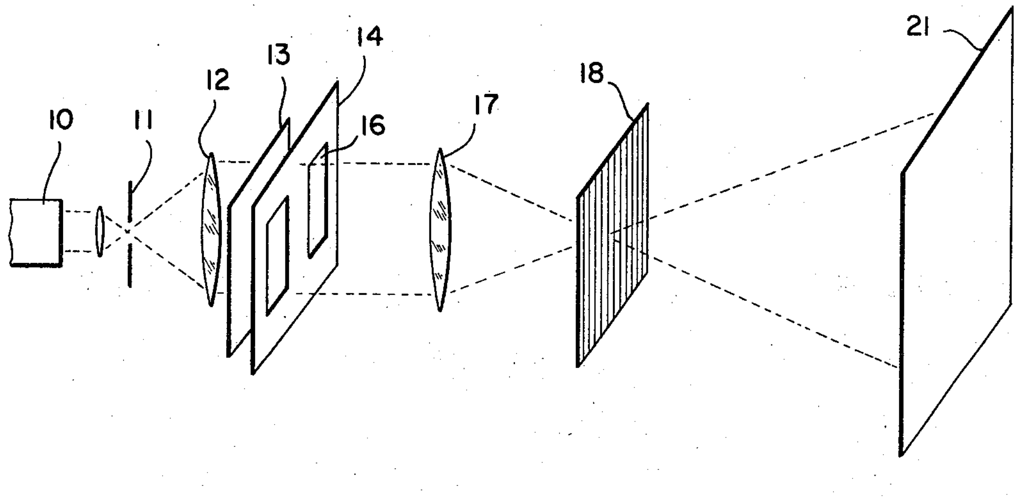
FIG. 5 is a schematic view of another embodiment of the invention which utilizes only one lens.

The embodiment shown in FIG. 1 is the preferred embodiment. However, other embodiments which use only one lens, instead of two, to perform the spatial filtering operation have been constructed. FIG. 5 shows a single lens system which also magnifies the subtracted image.

The workpiece is illuminated with a plane collimated beam from laser 10, as before. The lens 19 is positioned to form an image of the workpiece and the Fraunhoffer diffraction pattern is produced at the back-focal plane of the lens. The amplitude characteristic of the diffraction pattern is the same as in the embodiment of FIG. 1 and, thus, the same parameters for the grating period are necessary if the required side image lateral translation is to be obtained.

Figure 6:
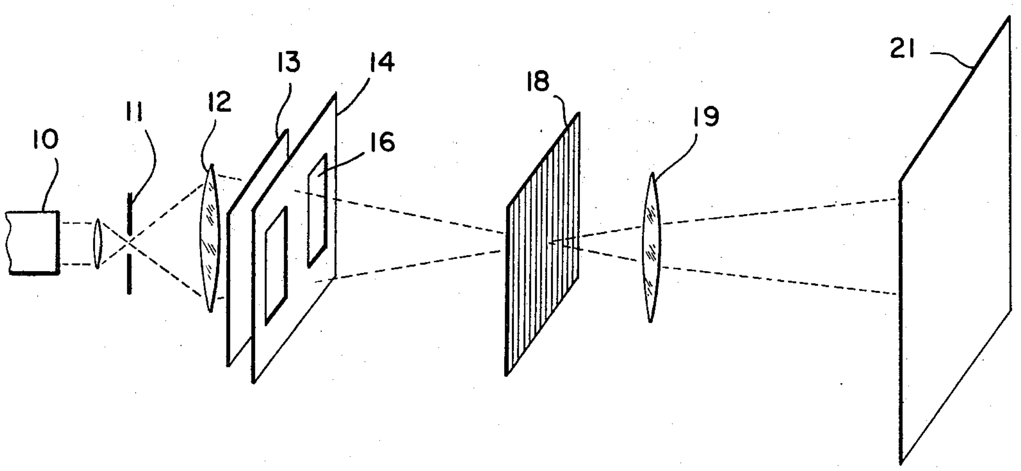
FIG. 6 is a schematic view of yet another embodiment of the invention which utilizes a converging beam of light.

A further embodiment is shown in FIG. 6. This is somewhat inferior in operation to the embodiments of FIGS. 1 and 5 because of the aberrations it introduces, however, the embodiment of FIG. 6 has other advantages, the principal one being that by varying the distance between the workpiece and the grating the lateral displacement between the subtracting images may also be varied. The workpiece-to-grating distance is effectively (d) in Equation 1. In this embodiment, light from laser 10 is passed through two lenses, 41 and 42, before impinging upon workpiece 13. This causes the beam to be convergent rather than collimated, as in the previous embodiments. Because the workpiece is illuminated with a converging beam, rather than a plane wave, aberrations are introduced in the periphery of the object which distort the diffraction pattern from these parts of the workpiece. However, for some applications this may be tolerated in view of the somewhat greater ease with which this embodiment of the invention may be aligned.

The results of some actual experiments will now be discussed. The arrangement of FIG. 6 was set up and an integrated circuit photomask with a 1.57mm (0.062 inch) step and repeat was used as the workpiece. In this photomask one feature was omitted and a special test pattern substituted therefor. A 500 line/inch Ronchi grating was placed at the Fourier Transform plane and the distance between the photomask and the grating was established as five inches. The side images on the screen were adjusted to be 1.57mm apart. A mask having a double aperture, each aperture being 1.57mm wide, separated by 3.14mm, was placed behind the IC photomask. The grating was adjusted for the asymmetrical mode to give subtraction. The subtracted image on the display screen showed one large error feature which was, of course, the substituted photomask test pattern. The subtracted image thus contained both the test pattern and the IC photomask pattern details (i.e. all the differences). Other features on the mask were noted as having small defects which were believed to be dust and contamination. The bottom right-hand side of the particular test pattern used had four small lines of widths 11$\mu$m, 8$\mu$m, 5$\mu$m, and 2$\mu$m. Of these, the larger three were visible as errors, suggesting a 5$\mu$m resolution for the particular lenses used.

The photomask-to-grating distance was changed by a small amount so that the subtracted features were not exactly superimposed. This was equivalent to a small step-and-repeat error on the photomask. The effect on the screen was that vertical edge defects were displayed. The feature displacement was about 3.8$\mu$m (0.00015 inch) which is the minimum that could be detected with the lenses used.

Earlier it was stated that the embodiment of FIG. 6 might introduce aberrations in the subtracted image and this, indeed, was found to be true. In this experiment the double aperture was moved off axis to the edge of the field. There wre two noticeable effects: the first being due to the converging beam where the edges break through. This is because the Fourier transform is distorted so that parts of the spatial frequency spectrum of the image do not subtract.

The second effect is due to lens aberrations which causes image subtraction to change image addition in different parts of the field. The result is such that this configuration is of use primarily with small field applications, which implies small lateral image displacements.

If larger lateral displacements can be obtained, with good subtraction, then, in addition to being able to inspect integrated circuits with a larger step-and-repeat, the system may also be used to simultaneously inspect larger areas of a mask. Further, by comparing the first column with the tenth, and using other, different combinations, an accurate check on step-and-repeat errors can be performed.

Experiments were also performed on the same system using a higher frequency grating, that is a 125 lines/mm phase grating, which yields a lateral displacement of six workpiece features. The whole view of the image, therefore, is the subtracted image. Image subtraction was only obtained over a restricted area, with the operation changing to image addition in the lower left part of the image. Image distortion was quite evident since parts of the image were found to subtract completely, while others experienced edge breakthrough. This is due in part to the converging nature of the illumination of the workpiece.

The above experiment was repeated with the system of FIG. 5 to remove the aberrations caused by the converging beam. The grating used was a 125 lines/mm grating giving a lateral displacement of 9¾ features. Fringes showing different areas of image subtraction and addition were still found to be present. This demonstrated how the particular lens used tends to limit the performance of image subtraction by restricting the field over which satisfactory subtraction can be obtained. For optimum operation, therefore, the lens should have less than ¼ wave aberration over the field of view of interest. This will prevent phase changes being introduced between the subtracted images which in turn change the subtraction condition to addition.

The final set of experiments involved the inspection of periodic, thin-film photomasks. The photomask used comprised a 3 × 3 array of 34.2mm (1.34 inch) × 27mm (1.06 inch) patterns. Thus, a 34.2mm displacement was required. The experiment used the embodiment of FIG. 5 with a 125 lines/mm grating and a 42cm focal length transform lens. There was a small modification in that the beam illuminating the mask was made slightly convergent to achieve the exact displacement required with the 125 lines/mm grating. The converging wavefront radius was 88cm. Errors, mainly dust, were seen as white specks on a black background over the area where subtraction was obtained. Again, the lens quality limited the subtraction area which constituted approximately a 12mm diameter circle. With such a large subtraction distance, it was found necessary that the illuminating laser beam have a uniform intensity distribution, otherwise complete subtraction was not obtained.

If the grating lines are curved, then at a certain vertical spatial frequency, the condition changes from addition to subtraction as the grating lines bend over a quarter period. This results in those spatial frequencies adding instead of subtracting and manifests itself as edge breakthrough. The effect geometrically is to image the two subtracting images at slightly different planes.

Thus, it is desirable that the gratings be straight to better than a quarter spacing over the aperture at which they are being used.

As is well known, a Fourier transform is a function of both amplitude and phase and if there are any phase distortions, caused for example by varying workpiece thicknesses, the diffraction pattern will be distorted. This will cause deviations in the subtraction of the black and white images.

The simplest phase distortion to consider is that of a glass wedge. A wedge angle $\theta$ would give a transmission of:

$$T = \exp\left(j\,(n-1)\,(2\pi/\lambda)\cdot x \sin\theta\right)$$

where $n$ is the refractive index of the glass.

The Fourier transform of T is:

$$t(x_1) = \delta(x_1 - c),$$

$$c = d\,(n-1)\sin\theta.$$

Thus, the diffraction pattern would be displaced laterally by (c). If (c) were as much as a quarter of the grating period than the subtraction of the image would change to addition. Thus, changes in workpiece thickness, which give local changes in parallelism greater than a ($\theta$) corresponding to, say, ±⅛ of the grating period, will cause changes in the subtracted image. Since the grating period decreases with increasing image separation, tolerances on workpiece thickness would have to be better for larger step-repeat distances. This tolerance is about two times as critical as that for the intensity spatial filtering technique disclosed in my above-referenced copending application. This problem, should it arise, is easily avoided by using a liquid gate to contain the workpiece.

The experiments demonstrate that spatial filtering subtraction works well for inspecting workpieces, such as IC photomasks of 1.57mm (0.062 inch) step-and-repeat, by observing differences between the first and third columns in the image, etc. It is also evident that if high quality lenses are used, larger step-and-repeat patterns may be inspected with good resolution. Also, the step-and-repeat spacing itself may be checked by using a sequence of gratings which give successively larger side image displacements, the most likely practical limit on side image displacement magnitude being the quality of the workpiece.

One further advantage, not discussed heretofore, is that patterns having repeated features in one dimension only can be inspected. Thus, if a photomask comprised only identical columns of features, with no repeated features in each column, these could nevertheless be inspected by subtracting the columns from each other, something not possible with my earlier technique.

In summary, the results of the experiments on thin-film photomasks show that, if a suitable quality lens is used, spatial filtering subtraction may be used to inspect a mask. A suitable lens for this technique is a commercially available 600mm focal length lens having a field size of 59mm. This lens gives a maximum step-and-repeat size for inspection of about 20mm for a full subtracted view. Workpiece quality, however, may restrict use to a smaller step-and-repeat. For a 20mm step and repeat, using 633 mm laser wavelengh, waviness in the workpiece should be less than 0.02$\mu$m radians over the inspection field of 20mm.

The above assumes that entire columns will be compared simultaneously. Actually, if the width of the apertures in the mask is made a sub-multiple of the step-and-repeat, for example, ½, it is possible to compare less than a full column at a time. This means that arrays having less than four columns may be inspected. For example, if the aperture width is ½ the step-and-repeat, a two column array may be inspected by comparing the left half of column 1 with the left half of column 2, and then the right half of column 1 with the right half of column 2, and so on.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. A method of detecting nonperiodic errors in a workpiece containing a matrix-like array of normally identical elements, which comprises the steps of:

directing a beam of coherent radiation onto said workpiece to modulate said beam;

passing the modulated beam through a mask containing at least two apertures, said apertures being aligned with the columns of the array, the widths of the apertures, and the aperture-to-aperture spacing, both being functions of the element-to-element spacing along the rows of the array;

passing the beam through a lens positioned in the path of the apertured beam from the mask to form Fraunhoffer diffraction patterns of portions of the workpiece in the focal plane of the lens;

passing the beam through an optical grating positioned in the path of said beam, in the focal plane of the lens, the rulings of said grating being parallel with a major axis of said apertures, and asymmetric with respect to the optical axis, and the grating periodicity being a function of the element-to-element spacing along the rows of the array; and then displaying, on detecting means, the resultant central and side images of each aperture in the mask, the centermost side images of each aperture overlapping and cancelling, except for nonperiodic errors in the workpiece which are not cancelled and, hence, are detected.

2. The method according to claim 1 including the further step of, prior to said displaying step, passing said beam through a second lens to reimage the Fraunhoffer diffraction pattern upon said detecting means.

3. The method according to claim 1 wherein said workpiece is an integrated circuit photomask.

4. The method according to claim 1 wherein said workpiece is a thin-film photomask.

5. The method according to claim 1 wherein said optical grating is an absorption grating.

6. The method according to claim 1 wherein said optical grating is a phase grating.

7. The method according to claim 1 wherein said optical grating is asymmetrically positioned laterally, with respect to said optical axis, by one-quarter period.

8. The method according to claim 1 wherein said optical grating is asymmetrically positioned laterally, with respect to said optical axis, by one-half period.

9. The method according to claim 1 wherein the element-to-element spacing along each row of the array and the width of each aperture is $b$, and the aperture-to-aperture spacing is $2b$.

10. The method according to claim 9 wherein said array includes N rows and M columns, where $N \geq 1$ and $M \geq 4$, said method comprising the further steps of:

respectively aligning said apertures with the first and third columns in the array;

comparing, at said detecting means, said first and third columns to detect nonperiodic errors therein; and then laterally displacing said workpiece, relative to the optical axis, to successively compare the second column with the fourth column, the $(M-2)^{th}$ column with the $M^{th}$ column.

11. The method according to claim 1 wherein the element-to-element spacing along each row of the array is $b$, the width of each aperture is $q$, and the aperture-to-aperture spacing is $2q$, where $q$ is an integral multiple of $b$ or sub-multiple of $b$ which is $\leq \frac{1}{2}b$.

12. The method according to claim 11 wherein said array includes N rows and M columns, and the method includes the further steps of:

aligning said apertures with the first and the $(1+J)^{th}$ columns in the array, where $J \geq 1$;

comparing, at said detection means, said first and said $(1+J)^{th}$ columns to detect nonperiodic errors therein; and then laterally displacing said workpiece, relative to the optical axis, by $(M - J - 1)$ times the width of one column, to successively compare all remaining columns or fractions of columns in the array one with the other, up to and including said $M^{th}$ column.

13. A method of detecting nonperiodic errors in a workpiece containing a matrix-like array of normally identical elements, which comprises the steps of:

passing a beam of coherent radiation through said workpiece to modulate said beam;

passing the modulated beam through a mask containing at least two apertures, said apertures being aligned with the columns of the array, the widths of the apertures and the aperture-to-aperture spacing both being functions of the element-to-element spacing along the rows of the array;

passing the aperture modified beam through a lens to form Fraunhoffer diffraction patterns of portions of the workpiece in the focal plane of the lens;

passing said beam through an optical grating positioned in the focal plane of the lens to form a central and at least two side images of each aperture in the mask, the rulings of said grating being parallel with a major axis of said apertures, and asymmetric with respect to the optical axis, and grating periodicity being a function of the element-to-element spacing along the rows of the array; and then displaying, on detecting means, said central and side images of each aperture, the centermost side images of each aperture overlapping at the detecting means and cancelling, except for nonperiodic errors in the workpiece which are not cancelled, and, hence, are detected.

14. A method of detecting nonperiodic errors in a workpiece containing a matrix-like array of normally identical elements, which comprises the steps of:

passing a convergent beam of coherent radiation through said workpiece to form Fraunhoffer diffraction patterns of portions of the workpiece at the focal point of the converging beam;

passing the beam, after passage through the workpiece, through a mask containing at least two apertures, said apertures being aligned with the columns of the array, the widths of the apertures and the aperture-to-aperture spacing, both being functions of the element-to-element spacing along the rows of the array;

passing the aperture modified beam through an optical grating positioned at the focal point of the converging beam to form a central image and at least two side images of each aperture in the mask, the rulings of the grating being parallel to a major axis of said apertures, and asymmetric with respect to the optical axis; and then passing the beam through an imaging lens to form, on a display device, the central and side images of each aperture, the innermost side images of each aperture overlapping and cancelling on the display device, except for nonperiodic errors therein which are not cancelled and, hence, are detected.

15. Apparatus for detecting nonperiodic errors in a workpiece containing a matrix-like array of normally identical elements, which comprises:

a source of a beam of coherent, collimated radiation, said beam illuminating the workpiece to be inspected;

a mask, positioned to intercept said beam after passage through said workpiece, said mask having at least two apertures therein, said apertures being aligned with the columns of the array, the widths of the apertures and the aperture-to-aperture spacing being functions of the element-to-element spacing along the rows of the array;

a lens, positioned to intercept the beam after passage through said mask, for forming Fraunhoffer diffraction patterns of portions of said workpiece in the focal plane of the lens;

an optical grating, positioned in said focal plane, to form a central image, and at least two side images, of each of the apertures in the mask, the rulings of said grating being parallel to a major axis of the apertures in the mask and asymmetric with respect to the optical axis, and the grating periodicity being a function of the element-to-element spacing along the rows of the array; and means, positioned to intercept the beam after it has been diffracted by said grating, for displaying the central and side images of each of said apertures, the centermost side image of each aperture overlapping and cancelling, except for nonperiodic errors which are not cancelled and, hence, are detected.

16. Apparatus according to claim 15 wherein said displaying means comprises:

a transforming lens, positioned to intercept said beam after passage through said diffraction grating, to reconstruct said Fraunhoffer diffraction patterns; and a screen, positioned to receive said reconstructed patterns, said centermost side images overlapping and cancelling on the surface of said screen.

17. Apparatus according to claim 15 wherein said optical grating is an absorption grating.

18. Apparatus according to claim 15 wherein said optical grating is a phase grating.

19. Apparatus according to claim 15 wherein said optical grating is asymmetrically positioned laterally, with respect to the optical axis, by one-half period.

20. Apparatus according to claim 15 wherein said optical grating is asymmetrically positioned laterally, with respect to the optical axis, by one-quarter period.

21. Apparatus according to claim 15 wherein, if the element-to-element spacing along the rows of the array is $b$, the width of each aperture is $b$ and the aperture-to-aperture spacing in the mask is $2b$.

22. Apparatus according to claim 15 wherein, if the element-to-element spacing along the rows of the array is $b$, the width of each aperture is $q$ and the aperture-to-aperture spacing in the mask is $2q$, where $q$ is an integral multiple of $b$ or sub-multiple of $b$ which is $\leq \frac{1}{2}b$.

23. Apparatus for detecting nonperiodic errors in a workpiece including a marix-like array of normally identical elements, which comprises:

a source of a beam of coherent, convergent radiation, said beam illuminating the workpiece to be inspected, and forming Fraunhoffer diffraction patterns of portions of the workpiece at the focal point of the converging beam;

a mask, positioned to intercept the convergent beam after passage through said workpiece, said mask having at least two apertures therein, parallel to the columns of the array, the widths of the apertures and the aperture-to-aperture spacing being a function of the element-to-element spacing along the rows of the array;

an optical grating, positioned at said focal point, to form a central image, and at least two side images, of each aperture in the mask, the rulings of said grating being parallel with a major axis of the apertures of the mask and asymmetric with respect to the optical axis; and means, positioned to intercept said beam after it has been diffracted by said grating, for displaying the center and side images of said apertures, the centermost side image of each of said apertures overlapping and cancelling, except for nonperiodic errors which do not cancel and, hence, are detected.

* * * * *

L-566-PT
(6-69)

UNITED STATES PATENT OFFICE
CERTIFICATE OF CORRECTION

Patent No. 3,787,117 Dated January 22, 1974

Inventor(s) L. S. WATKINS

It is certified that error appears in the above-identified patent and that said Letters Patent are hereby corrected as shown below:

In the specification, column 1, line 19 "Picturephone" should read --Picturephone ®--; line 23, "Picturephone" should read --Picturephone ®--. Column 3, line 2 "these" should read --those--; line 21 "$f$(x)" should read --f(x)--; line 23, "pattern of" should read --pattern or--; Equation 1, "$f$(x)e" should read --f(x)e--; Equation 3, "$f(-x_1)$" should read --$f(-x_1)$--. Column 4, Equation 8, "$f(-x_1)$" should read --$f(-x_1)$--; line 5, "imates" should read --images--; line 14, "system is" should read --transmission--; line 15, "capabilities" should read --absorption--. Column 5, line 33, "ptical" should read --optical--; line 36, "systemis" should read --system is--. Column 8, line 3, "than" should read --then--.

In the claims, claim 23, column 12, line 19, "marix" should read --matrix--.

Signed and sealed this 9th day of July 1974.

(SEAL)
Attest:

McCOY M. GIBSON, JR.
Attesting Officer

C. MARSHALL DANN
Commissioner of Patents